(12) United States Patent
Lewis et al.

(10) Patent No.: US 10,019,465 B2
(45) Date of Patent: Jul. 10, 2018

(54) COMPRESSION OF TIMING DATA OF DATABASE SYSTEMS AND ENVIRONMENTS

(75) Inventors: Cameron Lewis, Vista, CA (US); Elizabeth Brealey, San Diego, CA (US); Michael Reed, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 217 days.

(21) Appl. No.: 13/605,227

(22) Filed: Sep. 6, 2012

(65) Prior Publication Data

US 2014/0067777 A1 Mar. 6, 2014

(51) Int. Cl.
*G06F 17/30* (2006.01)

(52) U.S. Cl.
CPC .. *G06F 17/30289* (2013.01); *G06F 17/30153* (2013.01)

(58) Field of Classification Search
CPC ................ H03M 7/30; G06F 17/30153; G06F 17/30289; G06F 17/30303; H04L 69/04
See application file for complete search history.

(56) References Cited

U.S. PATENT DOCUMENTS

| 5,793,868 | A  | * | 8/1998 | Micali ................... H04L 9/3268 380/28 |
| 2005/0169365 | A1 | * | 8/2005 | Clark ....................... 375/240.01 |
| 2008/0071818 | A1 | * | 3/2008 | Apanowicz et al. ......... 707/101 |
| 2008/0183737 | A1 | * | 7/2008 | Bhalotia et al. .............. 707/101 |
| 2013/0063288 | A1 | * | 3/2013 | Bley ....................... H04L 43/04 341/87 |

OTHER PUBLICATIONS

Raman, Vijayshankar et al.; How to Wring a Table Dry: Entropy Compression of Relations and Querying of Compressed Relations; Sep. 12-15, 2006; ACM; VLDB '06; p. 858.*

* cited by examiner

*Primary Examiner* — Richard Bowen
(74) *Attorney, Agent, or Firm* — Ramin Mahboubian

(57) ABSTRACT

Timing data associated with a database or database system can be stored in a reduced or compressed form which can be decompressed back to a full or original form. In doing so, timing data can be compressed by using a subset of a full set of possible values (e.g., a determined range which is more likely to occur) instead of using a full set of possible values. Timing data can also be compressed by eliminating redundant, insignificant duplicate and/or common values, for example, between one or more components (e.g., start and end times of a period of time) of the timing data.

7 Claims, 4 Drawing Sheets

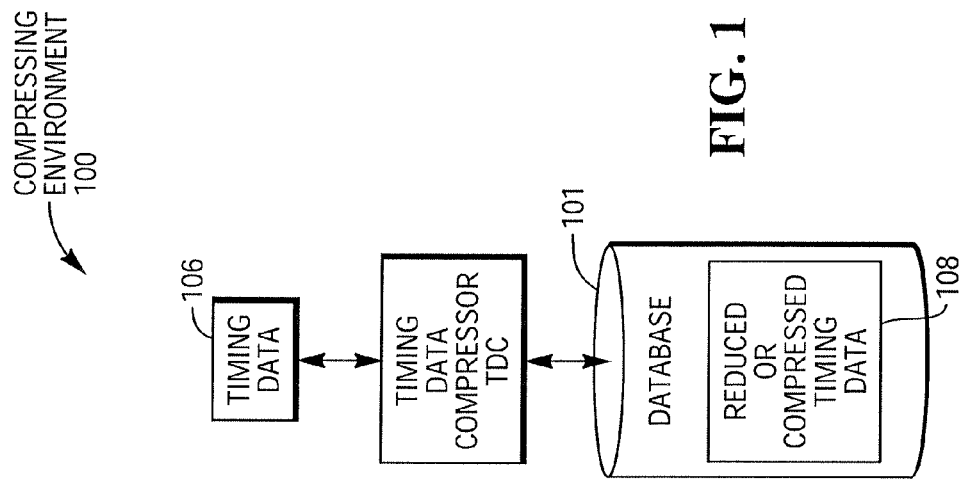
FIG. 1
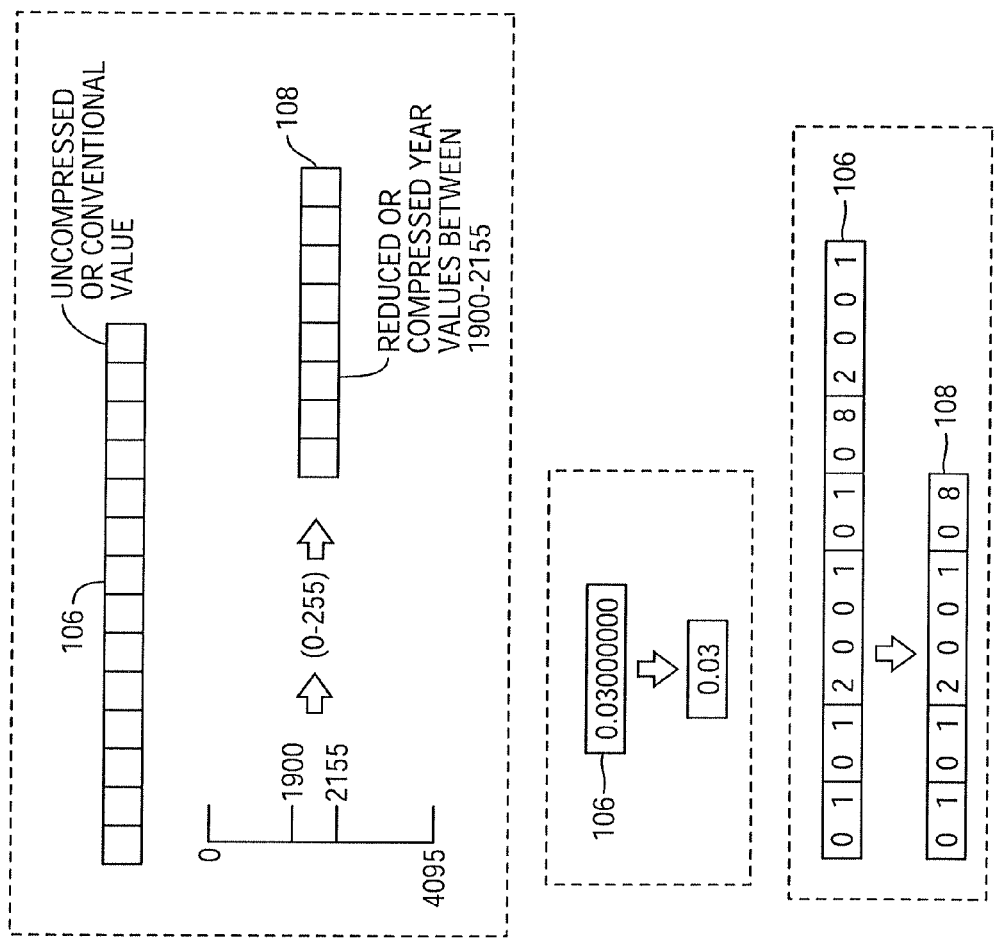

COMPRESSION OF TIMING DATA OF DATABASE SYSTEMS AND ENVIRONMENTS

BACKGROUND

Data can be an abstract term. In the context of computing environments and system, data can generally encompass all forms of information storable in a computer readable medium (e.g., memory, hard disk). Data and in particular, one or more instances of data can also be referred to as data object(s). As is generally known in the art, a data object can for example, be an actual instance of data, a class, type, or form data, and so on.

The term database can refer to a collection of data and/or data structures typically stored in a digital form. Data can be stored in a database for various reasons and to serve various entities or "users." Generally, data stored in the database can be used by the database users. A user of a database can, for example, be a person, a database administrator, a computer application designed to interact with a database, etc. A very simple database or database system can, for example, be provided on a Personal Computer (PC) by storing data on a Hard Disk (e.g., contact information) and executing a computer program that allows access to the data. The executable computer program can be referred to as a database program or a database management program. The executable computer program can, for example, retrieve and display data (e.g., a list of names with their phone numbers) based on a request submitted by a person (e.g., show me the phone numbers of all my friends in Ohio).

Generally, database systems are much more complex than the example noted above. In addition, databases have evolved over the years and are used in various businesses and organizations (e.g., banks, retail stores, governmental agencies, universities). Today, databases can be very complex. Some databases can support several users simultaneously and allow them to make very complex queries (e.g., give me the names of all customers under the age of thirty five (35) in Ohio that have bought all the items in a given list of items in the past month and also have bought a ticket for a baseball game and purchased a baseball hat in the past 10 years).

Typically, a Database Manager (DM) or a Database Management System (DBMS) is provided for relatively large and/or complex databases. As known in the art, a DBMS can effectively manage the database or data stored in a database, and serve as an interface for the users of the database. A DBMS can be provided as an executable computer program (or software) product as is also known in the art.

It should also be noted that a database can be organized in accordance with a Data Model. Notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation language, and a Query Language.

Today, databases have become prevalent in virtually all aspects of business and personal life. Moreover, database use is likely to continue to grow even more rapidly and widely across all aspects of commerce. Generally, databases and DBMS that manage them can be very large and extremely complex partly in order to support an ever increasing need to store data and analyze data. Typically, larger databases are used by larger organizations. Larger databases are supported by a relatively large amount of capacity, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity.

A popular type of database in use today is the relational database with a Relational Database Management System (RDBMS), which includes relational tables, also referred to as relations, made up of rows and columns (also referred to as tuples and attributes). In a relational database, each row represents an occurrence of an entity defined by a table, with an entity being a person, place, thing, or other object about which the table contains information.

One important aspect of computing is data compression. As those skilled in the art readily appreciate, data compression can play an important role in various computing environments and computer systems presently in use today. Generally, data compression can reduce the storage space needed to store data in a computing environment or system. In addition, network and Input/output (I/O) bandwidth can be improved by compressing data in a compressed form and using the compressed form to, for example, read, write and/or exchange data over a network.

As such, the importance of data compression is well recognized. This importance is further evidenced by the large number of data compression techniques (or methods or functions) that are widely known and used today. Data compression has been important and in use for database systems for some time now, but its importance is likely to become even more significant as databases store more and more data.

In particular, databases today are increasingly storing more and more timing information for data. Timing information can, for example, represent a period of time with a start and end date where data is considered to be valid, or provide a timestamp indicative of when data was last updated. In a more recently developed type of a database, often referred to as a temporal database, timing information (e.g. a Period Data Type (PDT) with a start and end time) can be considered to be a foundation that enables the storage and retention of changes to data.

In view of the ever increasing need to store more and more data in various computing environments and systems including database system and environments, data compression is very useful and is likely to become even more useful in the future.

SUMMARY

Broadly speaking, the invention relates to computing environments and/or systems. More particularly, the invention relates to techniques for reducing the size of the timing data, or effectively compressing/decompressing timing data, that can be stored in a database system and/or environment.

In accordance with one aspect of the invention, it can be determined whether to reduce the size or compress timing data associated with a database or database system. As a result, timing data associated with a database or database system can be stored in a reduced or compressed form which can be decompressed back to a full or original form.

In accordance with one aspect of the invention, timing data can be compressed by using a subset of full set of possible values (e.g., a determined range which is more likely to occur) instead of using a full set of possible values. In other words, the number of bits used to store the timing data can be reduced from the number needed to fully represent the timing data. For example, in binary (or a binary representation of values), about n bits are need to represent a values in a range of zero (0) to $2^n$ (e.g., 3 bits are need for values between zero (0) to seven (7) and 4 bits for values between zero (0) to fifteen (15), and so on. By way of example, year values that are more likely to occur can be in a determined range (e.g., 1900-2155) and compressed using offset values of the determined range (e.g., year "1900" would be represented by zero (0), year "1901" would be represented by one (1), and so on).

In accordance with another aspect of the invention, redundant or insignificant values in timing data can be eliminated to effectively compress the timing data. For example, insignificant zeros in seconds for a given precision of five decimals in a decimal numbering scheme (e.g., last two (2) zeros of 0.0100) can be eliminated to compress the timing data without losing its given precision.

In accordance with yet another aspect of the invention, duplicate data in timing data can be eliminated to effectively compress the timing data. For example, in case of a common year ("2010") between a start and an end date in a period of time for timing data ("Jan. 2, 2010"-"Apr. 5, 2010") the year value can be eliminated from the end date.

Still other aspects, embodiment and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 1 depicts a computing environment that includes a timing data compressor (TDC) for a database (or database system) in accordance with one embodiment of the invention.

DETAILED DESCRIPTION

Figure 2:
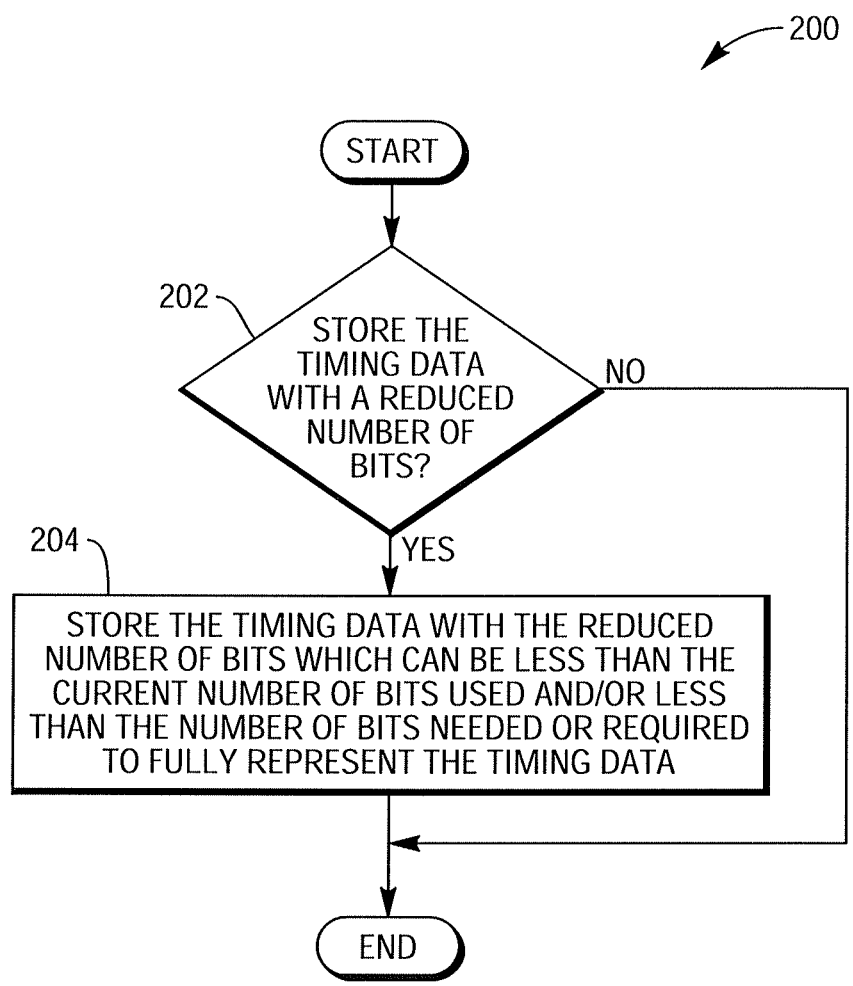
FIG. 2 depicts a method or storing timing data associated with information about time for data of a database system is depicted in accordance with another embodiment of the invention.

As noted in the background section, data compression can play an important role in various computing environments and systems including database systems and environments. As such, data compression is useful as it allows compressing of data in a more compact form which may, for example, take less storage, take less bandwidth to transmit, and so on.

In particular, with the ever increasing need and use of timing information in database systems, compression techniques for compression of timing information of databases would be very useful.

As such, it will be appreciated that timing data associated with database systems and environments can be compressed and decompressed using the techniques disclosed below.

More particularly, it can be determined whether to reduce the size or compress timing data associated with a database or database system. As a result, timing data associated with a database or database system can be stored in a reduced or compressed form which can be decompressed back to a full or original form. In accordance with one aspect of the invention, it can be determined whether to reduce the size or compress timing data associated with a database or database system. As a result, timing data associated with a database or database system can be stored in a reduced or compressed form which can be decompressed back to a full or original form.

In accordance with one aspect of the invention, timing data can be compressed by using a subset of full set of possible values (e.g., a determined range which is more likely to occur) instead of using a full set of possible values. In other words, the number of bits used to store the timing data can be reduced from the number needed to fully represent the timing data. For example, in binary (or a binary representation of values), about n bits are need to represent a values in a range of zero (0) to $2^n$ (e.g., 3 bits are need for values between zero (0) to seven (7) and 4 bits for values between zero (0) to fifteen (15), and so on. By way of example, year values that are more likely to occur can be a in a determined range (e.g., 1900-2155) and compressed using offset values of the determined range (e.g., year "1900" would be represented by zero (0), year "1901" would be represented by one (1), and so on).

In accordance with another aspect of the invention, redundant or insignificant values in timing data can be eliminated to effectively compress the timing data. For example, insignificant zeros in seconds for a given precision of five decimals in a decimal numbering scheme (e.g., last two (2) zeros of 0.0100) can be eliminated to compress the timing data without losing its given precision.

In accordance with yet another aspect of the invention, duplicate data in timing data can be eliminated to effectively compress the timing data. For example, in case of a common year ("2010") between a start and an end date in a period of time for timing data ("Jan. 2, 2010"-"Apr. 5, 2010") the year value can be eliminated from the end date.

In accordance with one aspect of the invention, timing data can be compressed by using a subset of full set of possible values (e.g., a determined range which is more likely to occur) instead of using a full set of possible values. In other words, the number of bits used to store the timing data can be reduced from the number needed to fully represent the timing data. For example, in binary (or a binary representation of values), about n bits are need to represent a values in a range of zero (0) to $2^n$ (e.g., 3 bits are need for values between zero (0) to seven (7) and 4 bits for values between zero (0) to fifteen (15), and so on. By way of example, year values that are more likely to occur can be a in a determined range (e.g., 1900-2155) and compressed using offset values of the determined range (e.g., year "1900" would be represented by zero (0), year "1901" would be represented by one (1), and so on).

In accordance with another aspect of the invention, redundant or insignificant values in timing data can be eliminated to effectively compress the timing data. For example, insignificant zeros in seconds for a given precision of five decimals in a decimal numbering scheme (e.g., last two (2) zeros of 0.0100) can be eliminated to compress the timing data without losing its given precision.

In accordance with yet another aspect of the invention, duplicate data in timing data can be eliminated to effectively compress the timing data. For example, in case of a common year ("2010") between a start and an end date in a period of time for timing data ("Jan. 2, 2010"-"Apr. 5, 2010") the year value can be eliminated from the end date.

Embodiments of these aspects of the invention are also discussed below with reference to FIGS. 1-4. However, those skilled in the art will readily appreciate that the detailed description given herein with respect to these figures is for explanatory purposes as the invention extends beyond these limited embodiments.

FIG. 1 depicts a computing environment 100 that includes a timing data compressor (TDC) 102 for a database (or database system) 101 in accordance with one embodiment of the invention. It will be appreciated that TDC 102 can, for example, be implemented in hardware and/or software by using one or more hardware and/or software components. A such, the TDC 102 can, for example, be implemented by using computer executable code stored on a computer readable medium (not shown) and can be executed by one or more processors (not shown). Those skilled in the art will readily appreciate that the processors can be part of a computing system or device (not shown).

Referring to FIG. 1, conceptually, the TDC 102 can store the timing data 106 in the database 101 with a reduced number of bits. The reduced number of bits can be less than the number of bits currently used and/or needed or required to store the timing data 106. As such, TDC 102 can effectively compress the timing data 106 from an uncompressed form and/or effectively use less bits to represent and store the timing data 106 than would be required to store it in a conventional form. In other words, to represent the timing data 106, TDC 102 can use less bits than the number of bits needed to fully represent the timing data in a conventional form or uncompressed form. Thus, in comparison to conventional systems, the TDC 102 can reduce the number of bits used to represent the same timing information (data) provided by the timing data 106. As a result, timing information associated with the database 101 can be represented in a reduced or compressed form (reduced or compressed timing data) 108 and stored in the database 101.

One exemplary technique that can be used by the TDC 102 to compress the timing data 106 can be based on a determined subset of possible values with a full set of values. By way of example, assuming that the timing data 106 represents a year value, which can be typically between zero (0) and "4095," storing the value for a particular given year, for example, the year "2012" can require about twelve (12) bits. Conventionally, two bytes (16 bits) are allocated to store the values of the years, including years 0-4095 in an uncompressed form. However, it will be appreciated that a set of possible values that are more likely to occur more often can be determined in accordance with one aspect of the invention. For example, it can be determined that years for a general or particular application or data type or object associated with a database is typically between the years "1900" and "2155," ranging about two hundred and fifty six (256) values. It will be appreciated that this range can, for example, be represented by only eight (8) bits, as increments of the start year ("1900") as opposed to the fourteen (14) bits required to fully represent the year "2012" in a conventional manner.

Another exemplary technique that can be used by the TDC 102 to reduce or compress the timing data 106 can be based on considering the significance of the timing data 106 and eliminating any redundant or insignificant values in the timing data 106. In particular, the TDC 102 can determine whether the timing data 106 includes one or more null values that are less significant than at least one other value provided in the timing data 106. By way of example, assuming that the timing data 106 represents a precise or precision time measurement in 1 to $10^{10}$ seconds ("0.0000000001), then, a given measurement of "0.0300000000" (expressed here in decimal and not binary form simplicity) can be effectively compressed to "0.03" by eliminating the zero values after the last non-zero value, namely "3," thereby requiring less bits to store the timing data 106 and reducing or compressing it from its conventional or current form. Similarly, measurement of "0.0000800000" can be effectively compressed to "0.00008" without losing any information, and so on.

Yet another exemplary technique that can be used by the TDC 102 to reduce or compress the timing data 106 can be based on considering duplicate information timing data and representing it more efficiently. In particular, period data types (PDT) can be compressed based on duplication of information between the start and end times of the period of the PDT. By way of example, assuming start and end times of "Jan. 1, 2001" and "Jan. 8, 2001" in the month/day/year form, it is apparent that the year and month values are the same. Generally, for at least for some PDT, often start and end times may share the same year and month, and in case of a timestamp associated with the start and end of a database operation (e.g., update) the day, hour and even minute of the day can be the same between the start and end timestamps. It should also be noted that indefinite, undetermined or unknown times (e.g., a start or end time associated with a PDT) can also be considered by the TDC 102 in an effort to compress the timing data 106. As a result, an indefinite, undetermined, or unknown time can effectively be encoded to, for example, indicate that the end time is indefinite or to be determined. For example, no end time could be provided in a compressed version of a PDT provided as the timing data 106 to indicate that the end time is indefinite. Compression of the timing data 106 is also discussed below by way of additional exemplary embodiments of the invention.

However, referring now to FIG. 2, a method 200 for storing timing data associated with information about time for data of a database system is depicted in accordance with another embodiment of the invention. Method 200 can, for example, be used by the TDC 102 (depicted in FIG. 1). Referring to FIG. 2, initially, it is determined (202) whether to store the timing data with a reduced or number of bits. Some of the exemplary operations that can be performed in determining (202) whether to store the timing data with a reduced number of bits are discussed below with reference to FIG. 3. However, it should be noted that, generally, the reduced number of bits can be less than current number used and/or the number of bits required or needed to fully represent the timing data in a conventional manner. Accordingly, if it is determined (202) to store the timing data with a reduced number of bits, the timing data is stored (204) with the reduced number of bits which can be less than the current number of bits used to store the timing data and/or it is less than the number or bits needed or required to fully represent the timing data before the method 200 ends. Otherwise, the method 200 ends without compressing or reducing the size of the timing information. As a result, the timing data can be stored in a conventional form or in its current uncompressed form.

Figure 3:
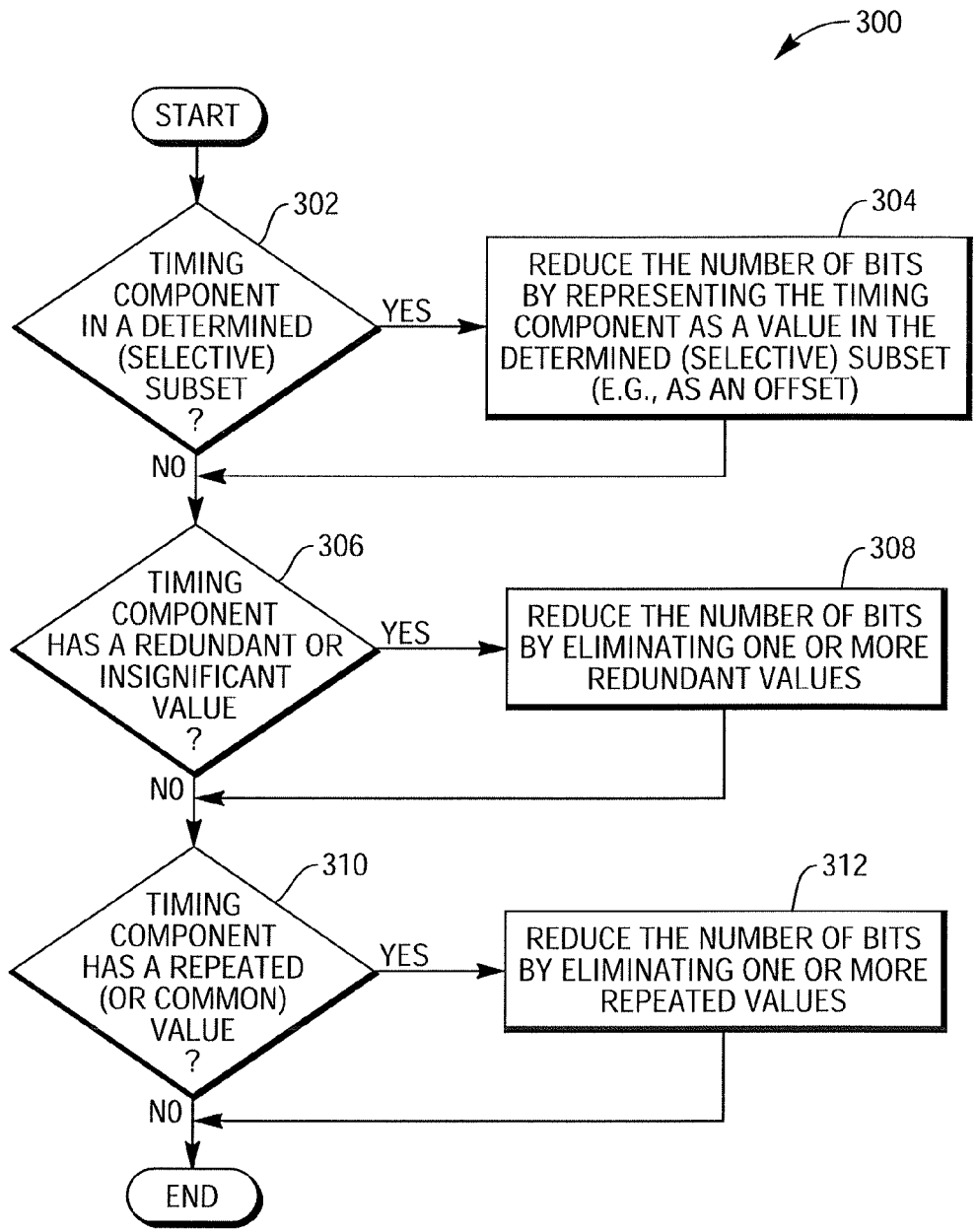
FIG. 3 depicts a method for representing timing data with a reduced number of bits, which is less than the number of bits used or required to use in order to fully represent the timing data, in accordance with one embodiment of the invention.

To further elaborate, FIG. 3 depicts a method 300 for representing timing data with a reduced number of bits or in a compressed form in accordance with one embodiment of the invention. The reduced number of bits to represent the timing data can be less than the number of bits used or required to represent the timing data in a conventional form. Compressing the timing data can effectively reduce the size of the timing data from its uncompressed form to compressed form with a smaller size than its current uncompressed form. Method 300 can represent in greater detail some of the operations that can be performed in determining (202) whether to store the timing data with a reduced number of bits (depicted in FIG. 2).

Referring to FIG. 3, initially, it is determined (302) whether the timing data includes at least one component with a value to be represented using a determined or selected subset of a full set of possible values required to fully represent the value. By way of example, it can be determined whether a "year" value is within a determined or selective range. The determined or selective range can, for example, represent a range of values that are determined to be more likely to occur. Accordingly, if it is determined (302) that the timing data includes at least one component (e.g., a year value) with a value in the determined or selected subset of values, one or more components of the timing data can be represented (304) as values in the determined or selected subset of values, for example, as offsets. As a result, before the method 300 ends, the timing data can be effectively represented with less bits required to represent it, or it can be compressed from its current uncompressed form.

In addition, it can be determined (306) the timing data includes one or more redundant or insignificant values. By way of example, it can be determined (306) whether one or more insignificant zero values can be eliminated from one or more components of the timing data. Accordingly, it is determined (306) that the timing data includes one or more redundant or insignificant values, the one or more redundant or insignificant values can be eliminated (308) to effectively compress the timing data.

Similarly, it can be determined (310) whether the timing data includes one or more repeated, duplicate, or common values. By way of example, it can be determined (306) whether one or more components of the timing data (e.g., "year" and "month" for start and end time values of a period data type) are the same. Accordingly, it is determined (310) that the timing data includes one or more repeated, duplicate, or common values, these values can be eliminated (308) to effectively reduce the number or bits needed to represent or to compress the timing data from its uncompressed form, before the method 300 ends.

As noted above, timing data that represents a period of time with a start and end value can be one of the predominate types of information provided for databases, especially, for temporal databases. As such, examples of representation with reduced or compression (herein after compression for brevity) of a period data type (PDT) that includes a start and end time are discussed below in accordance with embodiments of the invention.

More particularly, examples of a PDT can, include, "PERIOD (DATE)", "PERIOD (TIME[(n)] [WITH TIME ZONE])", and "PERIOD (TIMESTAMP[(n)] [WITH TIME ZONE])." In this context, possible values for each field can be as follows:

Year: Range: Any, but most likely between 0-4095 with a larger determined probability on the 1900-2155 range, Bits Required: 8 or 12, Month: Range: 0-11, Bits Required: 4, Day: Range: 0-30, Bits Required: 5, Hour (also used for TimeZone Hour): Range: 0-23, Bits Required: 5, Minute (also used for TimeZone Minute): Range: 0-59, Bits Required: 6.

Second: Range: can vary based on precision from 0-59.999999, Bits Required: 8, 16, 24, 26 (1, 2, 3, 4 bytes).

A such, a "PERIOD (DATE)" PDT having the form (day, month, year) for its start and end dates (e.g., start date: Jan. 8, 2012 and end date: Jan. 18, 2012) can have the uncompressed length of eight (8) bytes. However, the "PERIOD (DATE)" PDT can be compressed to have the form of "(length, flags, day, month, year, [second/end time values, if any])", having a total length of three to six (3-6) bytes in accordance with one embodiment of the invention. This represents an average compression or reduction of about 42.6% in size from the conventional or uncompressed forms.

Given that the maximum length of the compressed "PERIOD (DATE)" PDT can be six (6) bytes, the length field needs to be only three (3) bits to indicate the length of the compressed "PERIOD (DATE)." In addition, the flag field can be provided as there one (1) bit flags (3 bits), for example, to indicate the Begin/End year are equal, Begin/end month are equal and/or Begin/end day are equal. As a result, one or more of the (day, month, year) values for the end date can be effectively eliminated in the compressed form of the "PERIOD (DATE)" PDT.

In addition, in the "PERIOD (DATE)" PDT, if a year value is within the "1900-2155" range, it can be compressed to one (1) byte. Otherwise, twelve (12) bits may be used for a year value if it falls outside of the "1900-2155" range. As a result, the length of the year value can be indicative of whether or not an encoding is used or not (i.e., whether the year value has been compressed as an offset in the "1900-2155" range or has been provided as an uncompressed value of twelve (12) bits). An exception can be made in the unlikely event that a given year value can be represented with twelve (12) bits, whereby the uncompressed value may not be compressed and would be represented with more than the maximum length of the compressed "PERIOD (DATE)" PDT (more than six (6) bytes).

It should also be noted that if an end date of a PDT is indefinite ("UNTIL_CHANGED"), the "PERIOD (DATE)" PDT is compressed to be three (3) bytes. In fact, this can be the only condition where the "PERIOD (DATE)" PDT is compressed to be three (3) bytes so no other indication would be needed since three (3) bytes of compressed data can be indicative of a "UNTIL_CHANGED" undetermined value for the end date.

As another example, "PERIOD (TIME WITH TIME ZONE)" PDT the uncompressed length of sixteen (16) bytes can be compressed to about six to fourteen (6-14 bytes) in accordance with another embodiment of the invention. This represents an average compression or reduction of about 38.65% in size. The compressed form can have the following structure: "length, flags, minute, hour, begin second length, second."

Given that the maximum length of a compressed "PERIOD (TIME WITH TIME ZONE)" PDT can be fourteen (14) bytes, the length field only needs to be four (4) bits. In addition, 5 one (1) bit flags can be provided as the flag field in the compressed form of "length, flags, minute, hour, timezone minute, timezone hour, begin second length, second" for the compressed "PERIOD (TIME WITH TIME ZONE)" PDT. The flags can, for example, be designed in the order of: unused/reserved flag, Begin/End hour are equal, Begin/end minute are equal, Begin/End timezone hour are equal, Begin/end timezone minute are equal, Begin/end second are equal. Furthermore, values of seconds can be reduced in size (number of bits used to represent them) based on their precision. Also, it will be appreciated that the length of the seconds (or precision by which seconds are measured) need only be stored once, specifically, in the "begin second length" because the second fields are loaded last, so the length of the end PDT second can be inferred.

further, more exemplary PDT's are described below in accordance with yet additional embodiments of the invention. Namely, PERIOD(TIMESTAMP) and PERIOD (TIMESTAMP WITH TIME ZONE) which are similar to the PDTs discussed above are described below in a summarized form.

---
PERIOD(TIMESTAMP):
---

Uncompressed length: 20 bytes
   With Compression: 6-17 bytes
   Average Compression: 42.7% (this is the best performing compression on average)
   Structure:
      length, flags, begin second length, month, day, hour, minute, year, second
   Description:
- Since the maximum length is 17 bytes, the length field only needs 5 bits.
- provide 9 one (1) bit flags (9 bits), for example, interpreted in this order:
    End PDT is UNTIL_CHANGED
    Begin Year is in long form (12 bits)
    End Year is in long form (12 bits)
    Begin/End year are equal
    Begin/End month are equal
    Begin/End day are equal
    Begin/End hour are equal
    Begin/end minute are equal
    Begin/end second are equal
- seconds can be reduced in size based on their precision
- record the length of the second field for the begin PDT because the second fields are loaded last, so the length of the end PDT second can be inferred
- in the case of End PDT == UNTIL_CHANGED, only use 2 flags: End PDT is UNTIL_CHANGED and Begin Year is in long form. This can save 7 unnecessary bits, because the rest of the information can be inferred given the structure.

---
PERIOD(TIMESTAMP WITH TIME ZONE):
---

Uncompressed length: 24 bytes
   With Compression: 7-20 bytes
   Average Compression: 41.1%
   Structure:
      length, flags, begin second length, month, day, hour, minute, timezone hour, timezone minute, year, second
   Description:
- Since the maximum length is 20 bytes, the length field only needs 5 bits.
- provide eleven (11) one (1) bit 11 flags (11 bits), for example, interpreted in this order:
    End PDT is UNTIL_CHANGED ---
PERIOD(TIMESTAMP WITH TIME ZONE):
-continued
---

Begin Year is in long form (12 bits)
    End Year is in long form (12 bits)
    Begin/End year are equal
    Begin/End month are equal
    Begin/End day are equal
    Begin/End hour are equal
    Begin/end minute are equal
    Begin/end second are equal
    Begin/End timezone hour are equal
    Begin/End timezone minute are equal
- seconds can be reduced in size based on their precision
- only record the length of the second field for the begin PDT because the second fields are loaded last, so the length of the end PDT second can be inferred
- in the case of End PDT == UNTIL_CHANGED, only use 2 flags: End PDT is UNTIL_CHANGED and Begin Year is in long form. This saves 9 unnecessary bits, because the rest of the information can be determined given the structure.

In view of the foregoing examples, it will readily be appreciated that virtually all forms of timing data can be compressed in accordance with the invention. Also, compressed timing data can be decompressed based on the compression technique used or the given structure of the compressed data.

Multi-Node, Parallel Database Systems

The techniques of the invention can be useful for large database systems, including multi-node, parallel database systems partly because of the ever increasing need and desire to store more and more data in such systems. A multi-node parallel database system can, for example, use a massively parallel processing (MPP) architecture or system to perform various database operations in parallel.

Figure 4:
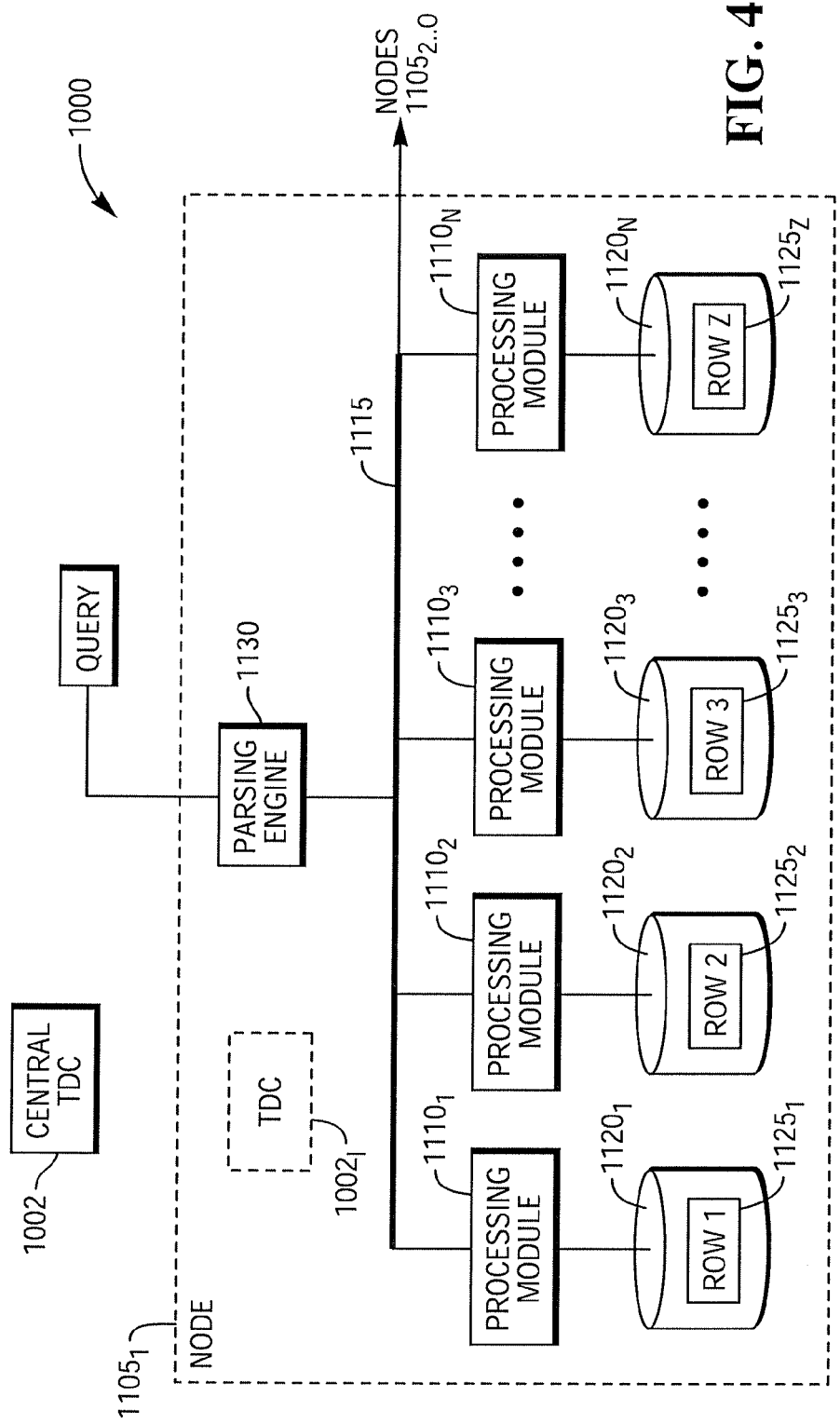
FIG. 4 depicts a database node of a database system or Database Management System (DBMS) in accordance with one embodiment of the invention.

To further elaborate, FIG. 4 depicts a database node 1105 of a database system or Database Management System (DBMS) 1000 in accordance with one embodiment of the invention. The database system 1000 can, for example, be provided as a Teradata Active Data Warehousing System. It should be noted that FIG. 4 depicts an exemplary architecture for one database node $1105_1$ of the DBMS 1000 in accordance with one embodiment of the invention. Referring to FIG. 4, the DBMS node $1105_1$ includes one or more processing modules 1110-N connected by a network 1115, that manage the storage and retrieval of data in data-storage facilities $1120_{1-N}$. Each of the processing modules 1110-N can represent one or more physical processors or virtual processors, with one or more virtual processors (e.g., Access Module Processor (AMP)) running on one or more physical processors.

For the case in which one or more virtual processors are running on a single physical processor, the single physical processor swaps between the set of N virtual processors. For the case in which N virtual processors are running on an M-processor node, the node's operating system schedules the N virtual processors to run on its set of M physical processors. By way of example, if there are four (4) virtual processors and four (4) physical processors, then typically each virtual processor could run on its own physical processor. As such, assuming there are eight (8) virtual processors and four (4) physical processors, the operating system could schedule the eight (8) virtual processors against the four (4) physical processors, in which case swapping of the virtual processors could occur.

In the database system 1000, each of the processing modules 1110$_{1-N}$ can manage a portion of a database stored in a corresponding one of the data-storage facilities 1120$_{1-N}$. Also, each of the data-storage facilities 1120$_{1-N}$ can include one or more storage devices (e.g., disk drives). It should be noted that the DBMS 1000 may include additional database nodes 1105$_{2-O}$ in addition to the database node 1105$_1$. The additional database nodes 1105$_{2-O}$ are connected by extending the network 1115. Data can be stored in one or more tables in the data-storage facilities 1120$_{1-N}$. The rows 1125$_{1-z}$ of the tables can be stored across multiple data-storage facilities 1120$_{1-N}$ to ensure that workload is distributed evenly across the processing modules 1110$_{1-N}$. A parsing engine 1130 can organize the storage of data and the distribution of table rows 1125$_{1-z}$ among the processing modules 1110$_{1-N}$. The parsing engine 1130 can also coordinate the retrieval of data from the data-storage facilities 1120$_{1-N}$ in response to queries received, for example, from a user. The DBMS 1000 usually receives queries and commands to build tables in a standard format, such as SQL.

In one implementation, the rows 1125$_{1-z}$ are distributed across the data-storage facilities 1120$_{1-N}$ by the parsing engine 1130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities 1120$_{1-N}$ and associated processing modules 1110$_{1-N}$ by a hash bucket map. The characteristics of the columns chosen for the primary index determine how evenly the rows are distributed.

Referring to FIG. 4, it should be noted that a Timing Data Compressor (TDC) 1002 can be provided for the database system 1000 in accordance with one embodiment of the invention. It will be appreciated that the TDC 1002 can be provided as a separate central entity (or component, or module) serving all of the database nodes 1105 and/or it can at least partially be implemented, for example, in the database node 1105$_i$ or one or more other nodes 1105 (not shown). Alternatively, or in addition, the TDC 1002 can be provided in one or more of the processing modules 1110$_{1-N}$ of the database node 1105$_i$ (not shown) or one or more other nodes 1105 (not shown). In any case, a TDC 1002 can be used to at least facilitate compression/decompression of data objects in one or more database nodes or 1105$_i$ if not all of the data objects processed by the database system 1000.

The various aspects, features, embodiments or implementations of the invention described above can be used alone or in various combinations.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display)

monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method of storing timing data associated with information about time for data stored as one or more database entries stored in a database associated with a database system, wherein the computer-implemented method comprises:
    maintaining within said database a subset of time values determined to occur more frequently for the timing data than one or more other time values in a full set of time values for the timing data;
    receiving a first timing data including a first time value for storage in said database;
    determining whether said first time value is contained within said subset of time values;
    when said first time value is contained within said subset of time values, using a reduced number of bits to represent said first time value, said reduced number of bits being less than a number of bits used to represent said first time value in an uncompressed form;
    determining whether said first time value has one or more redundant digits;
    when said first time value has one or more redundant digits, eliminating said one or more redundant digits from said first time value;
    determining whether the first timing data includes one or more repeated time values;
    when said first timing data includes one or more repeated time values, eliminating said one or more repeated time values from said first timing data; and
    storing in the database system the first timing data wherein said first time value is represented with said reduced number of bits when said first time value is contained within said subset of time values, said redundant digits are eliminated from said first time value, and repeated time values are eliminated from the first timing data.

2. The computer-implemented method of claim 1, wherein the redundant values are associated with a precision in measurement of time.

3. A computer-implemented method of storing timing data associated with information associated with time for data of a database system, wherein the computer-implemented method comprises:
    maintaining within said database a subset of time values determined to occur more frequently for the timing data than one or more other time values in a full set of time values for the timing data;
    receiving a first timing data including first and second time values for storage in said database;
    determining whether said first and second time values are contained within said subset of time values;
    when said first time value is contained within said subset of time values, using a first reduced number of bits to represent said first time value, and when said second time value is contained within said subset of time values, using a second reduced number of bits to represent said second time value;
    determining whether said first and second time values have one or more redundant digits;
    when said first time value has one or more redundant digits eliminating said one or more redundant digits from said first time value, and when said second time value has one or more redundant digits eliminating said one or more redundant digits from said second time value;

determining whether said first and second time values have at least one bit in common;

when said first and second time values have at least one bit in common, eliminating the at least one common bit from one of said first and second time values to store said first timing data with less bits than would be required if the full number of bits were used to represent said first and second values; and storing in the database system the first timing data wherein said first time value is represented by said first reduced number of bits when said first time value is contained within said subset of time values, said second time value is represented by said second reduced number of bits when said second time value is contained within said subset of time values, said redundant digits are eliminated from said first and second time values, and said at least one common bit is eliminated from said one of said first and second time values.

4. The computer-implemented method of claim 3, wherein the first timing data includes a time period, and wherein the first and second time values respectively represent a start time and an end time for the time period.

5. The computer-implemented method of claim 4, wherein the time period is one of more of the following:
   a period of time with a start and an end time, a date, time, timestamp, year, month, day, hour, minute and seconds.

6. The computer-implemented method of claim 3, wherein the computer-implemented method of claim 1 further comprises:
   storing an indication for the first timing data indicative of the elimination of the at least one bit in common.

7. The computer-implemented method of claim 6, wherein the storing of the indication for the timing data comprises:
   storing the indication as a part of the first timing data.

\* \* \* \* \*